United States Patent [19]
Cooper

[11] 3,798,525
[45] Mar. 19, 1974

[54] ELECTRO HYDRAULIC STEERING SYSTEM

[75] Inventor: Herbert G. Cooper, Kalamazoo, Mich.

[73] Assignee: General Signal Corporation, Rochester, N.Y.

[22] Filed: May 18, 1972

[21] Appl. No.: 254,398

[52] U.S. Cl............... 318/588, 91/361, 114/144 R
[51] Int. Cl. .............................................. G05d 1/00
[58] Field of Search ...... 318/564, 571, 588; 91/361, 91/362, 363; 114/144 R

[56] References Cited
UNITED STATES PATENTS

| | | | |
|---|---|---|---|
| 2,964,059 | 12/1960 | Geyer .............................. | 91/363 X |
| 3,106,084 | 10/1963 | Hoffman et al. ...................... | 91/363 |
| 3,527,186 | 9/1970 | Wennberg ........................... | 114/144 |
| 3,570,243 | 3/1971 | Comer et al. ....................... | 91/361 X |
| 3,269,676 | 8/1966 | Hopkins ............................ | 318/564 |
| 3,390,614 | 7/1968 | Tatum .............................. | 318/588 |
| 3,405,676 | 10/1968 | Hobbs et al. ....................... | 318/588 |
| 3,418,547 | 12/1968 | Dudler ............................. | 318/571 |

*Primary Examiner*—B. Dobeck
*Attorney, Agent, or Firm*—John F. Ohlandt

[57] ABSTRACT

An electro-hydraulic system especially adapted for the steering of riverboats and the like according to which accurate control is gained in the steering operation. The system includes a variable volume piston pump under the control of a servo controller so as to produce variable rates of fluid flow from the pump to an output steering device which is operative to effectuate precision steering of the vehicle. A steering device position feedback arrangement is provided according to which a signal is fed back, responsive to movement of the steering device, in such a way as to effectively nullify the initiating signal input to the servo controller, thereby to return the pump to a null position at a time when the steering device has assumed the position desired.

9 Claims, 2 Drawing Figures

ELECTRO HYDRAULIC STEERING SYSTEM

BACKGROUND, OBJECTS, AND SUMMARY OF THE INVENTION

This invention relates to an electro-hydraulic steering system generally adapted to the purpose of steering vehicles and more especially adapted to the task of accurately steering riverboats and like vehicles by hydraulic means.

It has become a long standing practice to provide hydraulic means for the steering of riverboats and like vehicles and to control such means by the simple expedient of using a control valve which operates to control the output steering device in a series of steps or jogs. However, it has been found that many of these jog-type steering systems are extremely erratic in their performance and, since they lack the fineness of control called for by the task encountered, they are subject to very severe handicaps in guiding and steering the riverboats and like vehicles.

It is therefore a fundamental object of the present invention to overcome the drawbacks associated with a jog-type, hydraulic steering system.

Another object is to provide a smooth, infinitely variable-type of steering system that will afford precision in control of the steering device and hence of the steering maneuver to be effected.

The above objects are fulfilled by the several features of the present invention. In accordance with a primary feature, the approach taken to providing a smooth and precisely controlled steering operation is to utilize a variable volume piston pump under the control of a step servo controller and an associated servo motor, and to provide a dual-provision feedback arrangement. That is to say, in addition to the feedback normally employed with a conventional servo controller system, which feedback responds to the position of the servo motor, another feedback means is provided. This second feedback means responds to a predetermined movement or positioning of the steering device which is under the control of the pump, so as to provide a signal of a polarity opposite to the input signal which in the first instance produced the predetermined fluid flow from the pump and, as a consequence, produced the movement of the steering device. In other words, the signal fed back from the steering device counters the original input signal, thereby causing the servo motor, and hence the pump under its control, to return to their original or null positions. The null position for the pump corresponds with zero fluid flow, occurring precisely when the desired steering objective has been attained. Thus, it will be understood that the steering device will remain in the position it has attained as a consequence of the predetermined fluid flow received from the pump.

From the foregoing it will have become apparent that the present invention enables the ready control of a heavy duty hydraulic steering apparatus for controlling and directing the movement of a riverboat and the like by means that permit smooth and precise control. The smooth and precise control arises from the capability of bringing the over center pump back to null, that is, to return it to a non-pumping condition and consequently terminating the flow of fluid therefrom at the precise point when the desired movement of the steering device has been achieved.

A more specific feature of the present invention resides in the precise arrangement for the feedback from the steering device. The feedback is accomplished by an additional potentiometer in shunt with the potentiometer normally used in connection with the input signal origination. The slide contacts on each of the potentiometers are commoned together and are connected to the same input terminal on the servo controller.

The foregoing and other objects, features and advantages of the present invention will be more fully apprehended from the following detailed description of an illustrative embodiment taken in connection with the annexed drawings in which:

DESCRIPTION OF PREFERRED EMBODIMENT

Figure 1:
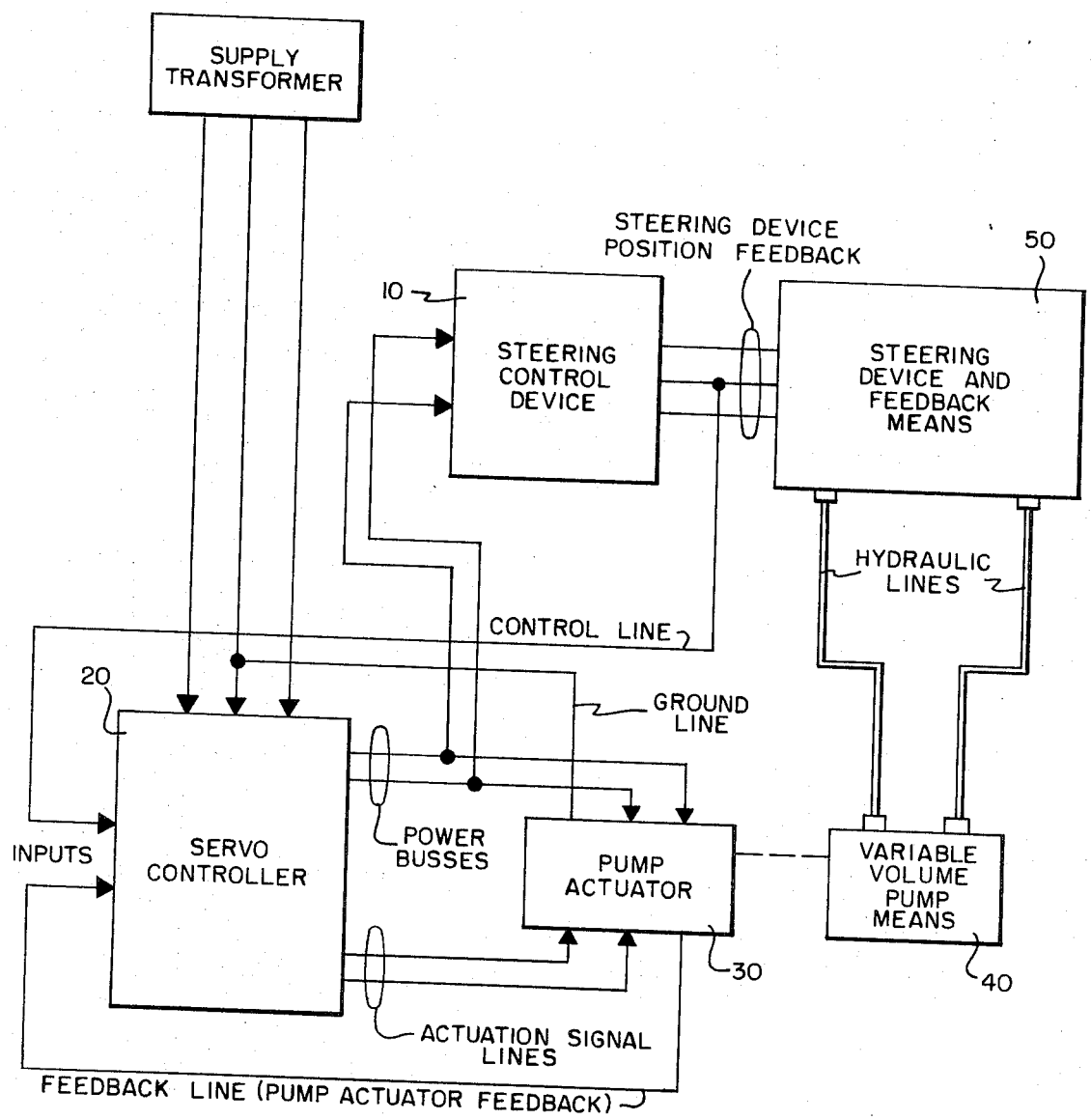
FIG. 1 is a block diagram illustrating the essential elements of an electro-hydraulic steering system in accordance with an illustrative embodiment of the present invention.

Before proceeding with a detailed description of the present invention, it is considered well to view the invention in its broadest perspective by referring to the block diagram of FIG. 1 in which the principal elements of the electro-hydraulic steering system are illustrated. These principal elements comprise a steering control device generally designated 10, which has the function, in response to the actuation of an input steering control member, of generating a command signal which is fed on a control line to one of the inputs of a servo controller, designated 20 in FIG. 1. The principles of operation of such a servo controller are per se well known. Such a servo controller is operative to produce stepping signals to a servo motor and to feed back a signal to the other input of a differential amplifier in accordance with the deviation between the desired movement of the output device and the actual movement of the device. Such principles of operation can be appreciated by reference to U.S. Pat. No. 3,418,547 to H. A. Dudler and assigned to the assignee of the present invention.

In the system illustrated in FIG. 1, the aforesaid servo motor is part of the pump actuator 30. As will be made apparent hereinafter, the servo motor is so arranged as to act to affect the rate of flow of hydraulic fluid from a variable volume pump 40 also illustrated in block form. It will be seen that the variable volume pump 40 has a pair of hydraulic lines connected to a combined device designated 50, comprising a steering device 50A and feed back means 50B (See FIG. 2). The variable rate of flow from the pump 40 is operative to produce movement of positioning of the steering device 50A such that a desired steering maneuver may be executed. It will of course be appreciated that a variety of steering devices can be utilized so as to effect control over a steering element, such as a rudder in the typical case of controlling a boat or like vehicle.

The feedback means 50B, which in accordance with the present invention is coupled to the steering device 50A, operates such that it exactly follows the movement of the steering device. Moreover, the feedback means is constructed and arranged to provide a signal, that is to say, a feedback signal, which is proportional to the position assumed by the steering device. This signal, which appears on the line designated "steering device position feedback" in FIG. 1, is of opposite polarity to the input signal normally appearing on the control line and fed at the input to servo controller 20. Thus this feedback signal, is effective to null the original input to the servo controller, thereby bringing the pump back to a null position. However, the steering device 50 remains in the predetermined position in which it has been placed by the foregoing operation of the pump 40. It will therefore be appreciated that the pump 40 has been brought back to a null position precisely when the steering device has produced the movement desired, that is, has assumed the position required to affect the rudder or like element useful in steering the vehicle.

On the other hand, if the steering control device 10, having assumed a given position, is thereafter returned to its neutral position, the pump 40 will then stroke in the opposite direction, whereby the steering device will operate in reverse fashion; that is to say, it will provide a feedback signal which will effectively bring the pump to its null position at the instant that the steering device has returned to the desired neutral or straight ahead position.

Figure 2:
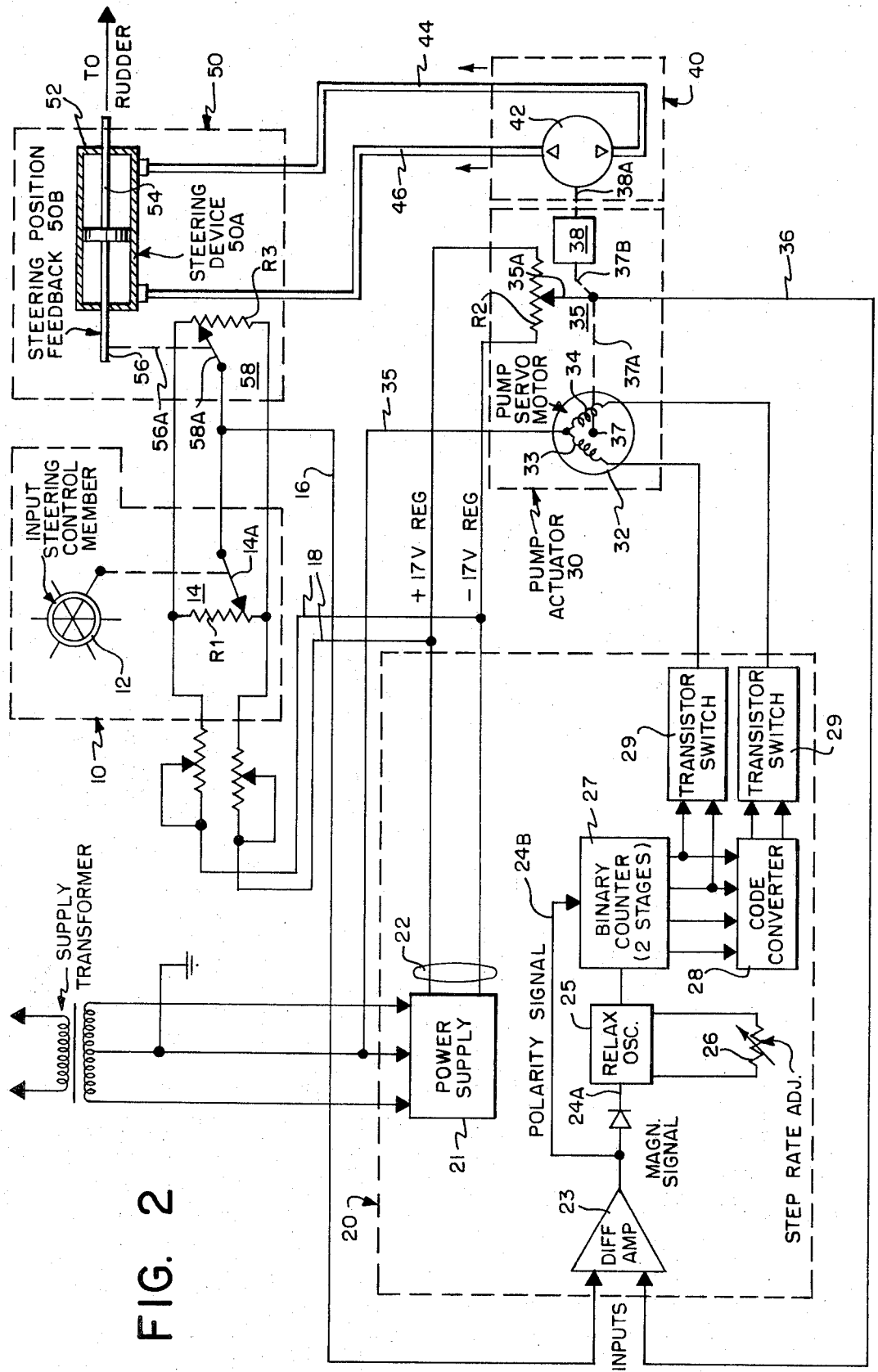
FIG. 2 is a schematic diagram of the electro-hydraulic system illustrating both the electronic controls and the hydraulic elements.

Referring now to FIG. 2, a schematic-block diagram is furnished so as to provide a detailed disclosure sufficient to a complete understanding of the operation of the system of the present invention. The same numerals refer to the same parts previously discussed in connection with FIG. 1. Thus the steering control components are shown within the dotted line box designated 10 in FIG. 2; correspondingly the other principal elements, namely the servo controller, pump actuator, variable volume pump and, finally, steering device and feedback means, all have their individual components included within the dotted-line boxes 20–50 respectively.

For the particular purposes of steering a riverboat or similar vehicle, the steering control device 10 comprises an input steering control member in the form of a steering wheel 12, and a command signal generating device in the form of a potentiometer 14 which is coupled to the steering device 12. The potentiometer 14 is connected to a source of power so that a voltage is developed across its resistor R1. A variable potential is generated when the steering wheel is moved to different compass positions, whereby the movable contact 14A of the potentiometer assumes different positions, thereby generating or producing different potentials on the control line 16 which is connected to the movable contact 14A and, at its other end, is connected to one of the inputs of the servo controller 20.

The servo controller 20 is essentially made up of the elements previously disclosed in U. S. Pat. No. 3418547 to H. A. Dudler. The servo controller is connected to the secondary of a suitable supply transformer by a three line connection involving grounded center-tapping of the secondary. The required power is produced within the servo controller by the power supply 21 which provides at its outputs +17 volts regulated and −17 volts regulated on power busses 22. These power busses supply power on the lines 18 to the resistor R1 of the potentiometer 14, as well as to all the other components of the system requiring a power supply.

The voltage that is picked off by the movable contact 14A is, as indicated before, supplied as one of the inputs to the servo controller and is connected to the differential amplifier 23. The other input to the differential amplifier is connected for purposes of feedback control, as will be explained in detail hereinafter. However, it is well understood that a differential amplifier such as the amplifier 23 is so arranged as to deliver an output signal which is proportional to the difference between two input signals. Specifically, the differential amplifier 23 has two output lines 24A and 24B so as to be able to deliver two signals, the first representing the magnitude of the difference between the input voltages, and the second indicating e polarity. It is usually found to be desirable to limit the magnitude of the signal on line 24A and, for this purpose, a diode is normally inserted therein. This feature however is not essential and may be dispensed with.

The signal present on the line 24A is applied to a relaxation oscillator 25. This relaxation oscillator has been described in detail in U.S. Pat. No. 3,418,547 and reference may be made to that patent for its detailed operation. The relaxation oscillator 25 delivers a train of pulses of uniform amplitude and controllable pulse rate. The pulse rate may be controlled by external resistor 26.

The pulse train output of the relaxation oscillator 25 is applied to the input of a two stage binary counter 27. Such a two stage binary counter recycles and repeats, after counting a sequence of four input pulses. In other words, its counts may be denoted 0, 1, 2, 3 – 0, 1, 2, 3, and so on. Such counting is usually termed "modulo four." The counter 27 is a reversible counter; that is to say, it is able to count in either direction; therefore it can also count in the order 0, 3, 2, 1 – 0, 3, 2, 1, and so on. It will be understood that the electrical states which appear at the outputs of the counter 27 are arranged in the "reflected" or Gray binary code, which is also sometimes termed the "cyclic permutation" binary code. In the following description this code will be designated for short, the "cyclic" code.

In order to provide both the reversibility feature, just described, and also to produce an output in the desired cyclic code for transmission to the servo motor, the binary counter 27 is shown connected to a code converter 28. The interrelationship between the counter 27 and the code converter 28 can be fully appreciated by reference to U.S. Pat. No. 3,418,547 to Dudler. Suffice to say here that the binary counter 27 is so arranged that its two stages count in the natural binary code while the converter 28 converts the natural binary code of those two stages into the cyclic binary code required. It should also be noted that the binary counter 27 includes a coupling selection means, which operates in response to the polarity-indicative signal on line 24B to enable either the coupling path of the one stage of the binary counter or the coupling path of the other stage, thereby to achieve counting selectively in either direction.

It will be appreciated that connections are so made from the binary counter 27 to the inputs of the code converter 28 and to the inputs of the power switches 29 that the required currents are supplied to the pump actuator 30; more specifically, to the servo motor 32 comprising an element of that actuator. The servo motor 32 is provided with two orthogonally disposed stator windings 33 and 34 which are connected to the respective outputs of the power switches or amplifiers 29. The midpoint of the two windings is connected to ground by the ground line 35.

For proper step-by-step advance of the servo motor 32, it is necessary that the windings 33 and 34 be first supplied with a current in one sense, and then with a current in the opposite sense, and preferably at the same or nearly the same magnitude. It is also required for proper operation of the servo motor 32 that the reversals of the sense of the current in each winding be alternated with like reversals of a like current in the other winding. This alternation of conditions is inherent in the structure of the "cycle" binary code. Accordingly, such code is advantageously exploited in this context so as to provide, in the required sequence, the appropriate combination of currents. For a detailed appreciation of the principles of stepping operation of the servo motor 32 in response to the outputs from the transistor switches 29 reference may be made to the aforesaid Dudler patent, particularly FIG. 4 thereof, which illustrates a typical phase reversal sequence of the currents in the windings of the servo motor and the corresponding sequence of on and off states for the transistors necessary to produce such sequence of currents.

It will be seen in FIG. 2 that a feedback potentiometer 35 is connected to the power busses 22 so as to connect a +17 volt supply to one end of the resistor R2 and −17 volts to the other end of that resistor. The feedback line 36 is connected from the movable contact or wiper arm 35A to the other input of the differential amplifier 23. Thus varying potentials picked off by the wiper arm 35A will be fed back to the appropriate input depending upon the position of the wiper arm. The wiper arm is coupled to the servo motor 32 and is moved in accordance with the rotation of its rotor 37.

The operation of the system as thus far described is as follows: Given any deviation between the angular positions of the wiper arms 14A and 35A of the potentiometers 14 and 35 respectively, a difference exists between the potentials picked off by them. Such difference is amplified by the differential amplifier 23 and the amplifier delivers on its first output path 24A a signal representing the magnitude of the voltage difference applied to its input terminals and, on its second output path 24B, a signal representing the polarity of the voltage difference. If the magnitude of the differential voltage exceeds a predetermined threshold, for example, a threshold of approximately 10 millivolts, the magnitude signal will start the relaxation oscillator 25 which will then put out a train of pulses, the frequency of which depends on the value selected for the variable resistor 26.

Pulses from the relaxation oscillator 25 are fed into the two-stage binary counter 27 and are counted "modulo four." The polarity signal coming from the differential amplifier output on line 24B is also fed to the counter 27 and, as indicated previously, determines whether the counter counts up or down. It will be appreciated that each state of the counter 27 corresponds to one of the four possible ways of exciting the windings 33 and 34 of the servo motor 32. Thus if the states of the two flip-flops used in the binary counter are denoted by 1 and 0 respectively, the correspondence between excitation states of the servo motor 32 and the states of the binary counter 27 can be tabulated as follows:

| State of flip-flops in counter 27 | | Excitation of servo motor 32 | |
|---|---|---|---|
| Flip-flop I | Flip-flop II | Winding 33 | Winding 34 |
| 0 | 0 | − | − |
| 0 | 1 | − | + |
| 1 | 0 | + | + |
| 1 | 1 | + | − |

(Counting down ↑ / Counting up ↓)   (CW rotation ← → CCW rotation / CW rotation ↓)

It will be understood, of course, that the flip-flops designated I and II correspond to the two stages previously indicated for the binary counter 27; that is to say, flip-flop I in the table corresponds with the right-hand stage of the binary counter 27, whereas flip-flop II, in the table corresponds with the left-hand stage of counter 27. It must be observed that flip-flop I can be used directly to control the excitation of winding 33 since digital 0 always corresponds to −, and digital 1 to +; hence, the direct connection of the counter 27 to the transistor switch 29 which is connected to winding 33. On the other hand, winding 34 is to have negative excitation whenever both flip-flops are in the same state (both 0 or both 1), whereas positive excitation is to be applied whenever the flip-flops are in opposite states. This explains why in the diagram of FIG. 2 code converter 28 is inserted between counter 27 and the transistor switch 29 which is connected to winding 34.

Although not specifically illustrated in FIG. 2, it will be understood that the regulated power supplies, comprising the power busses 22, are also connected, as required, to the various components of the signal generating and counting circuits thus far described.

It will now have become apparent that the electronic portion of the control system of the present invention functions in such a way as to permit fine control over a servo motor such that, for any slight deviations between a command signal and a signal fed back from a potentiometer which is actuated by the servo motor, the servo motor will be stepped to that position which produces a feedback signal of sufficient voltage so as to result in no differential voltage between the two inputs of the differential amplifier, and consequently the servo motor will come to rest at that position.

As described previously, the generation of a feedback signal of either polarity is accomplished by the upward or downward movement of the wiper arm 35A on the potentiometer 35. Such movement is effected by the coupling 37A shown by the dotted lines from the rotor 37 to the wiper arm 35A.

Turning now to the hydraulic portion of the system illustrated in FIG. 2, it will be seen that the servo motor 32 functions to control the operation of a pump 40. This function is achieved through the medium of a control device 38 connected by emans of a coupling 37B (indicated by the dotted lines at an angle to the horizontal), to the rotor 37 of servo motor 32. In turn, the control device 38 is connected, as indicated by the dotted lines 38A, to the pump 40 so as to control its fluid output.

The pump means 40 is chosen to be of special construction, being a device of the type previously described in U.S. Pat. No. 3,170,450 to Kent et al., and which can be operated as either a pump or as a hydraulic motor and for this reason will be referred to hereinafter as a motor-pump. A characteristic of this type of hydraulic device, shown schematically and designated 42 in FIG. 2, is that it has the ability to go "over center," thereby eliminating the need for four-way valves for reversing an output device, such as another hydraulic motor, which is to be driven by the motor-pump 42.

As already indicated, the motor-pump 42 is controlled in its operation by the device 38. The device 38 may take the form of a cam plate, the operation of which is very similar to the cam plate described in the Kent et al. U.S. Pat. No. 3,170,450. It should be mentioned that the motor-pump 42, being of the type disclosed in the Kent et al. patent, includes a rotary group of elements, consisting of a cylinder barrel having longitudinal bores therein with reciprocatory pistons mounted in the bores. The rotary group of elements is mounted for rotation relatively to the cam plate which is angularly adjustable. Thus, the angular position of the cam plate determines the length of strokes of the reciprocatory pistons of the cylinder barrel and consequently, the cam plate functions to determine and control the fluid flow rate from the motor-pump 42. It will be understood that the cam plate or device 38 is free to move between a maximum stroke-establishing position in one direction and a maximum stroke-establishing position in another direction, such directions being on opposite sides of a neutral or null position.

The motor-pump 42 is connected to the steering device and feedback means 50 by the hydraulic lines 44 and 46. In the particular embodiment illustrated, the steering device 50A comprises a steering cylinder 52 and a piston 54, the ends of the cylinder being in fluid communication with the lines 44 and 46. Connected to the piston 54 is a feedback device 50B comprising a feedback control rod 56 which operates in response to movement of the piston 54, through the coupling 56A, so as to affect the potentiometer 58 which comprises a resistance R3 and a movable wiper arm 58A.

For purposes of illustration the steering device 50A has been shown in a condition such that the piston 54 has been moved slightly to the left of center, thereby effecting upward movement of the wiper arm 58A, by dint of operation of control rod 56, so that a slightly negative polarity signal would tend to be generated by the potentiometer 58. However, if the piston 54 were at its center or mid-point within the cylinder 52, this would correspond to a mid-positioning of the movable wiper arm 58A. Similarly, movement of the piston to the right of center corresponds with the development of a positive polarity signal by the potentiometer 58.

Although in the embodiment illustrated in FIG. 2, the steering device has been shown in the form of a reciprocatory piston within a cylinder, it will be appreciated that a variety of other steering devices could be utilized so as to effect control over a steering element, such as a rudder in the case of controlling a boat or like vehicle. For example, a rotary hydraulic motor could be used instead of the reciprocatory device 50A shown.

OPERATION

Assuming that the input steering control member 12 has been rotated clockwise 90°, it will be understood that the servo motor 32 will follow this movement, as a consequence of the application of appropriate currents to the windings 33 and 34, due to the difference signal appearing at the output of the differential amplifier 23. This difference signal results from the initial disparity between the command signal, as generated by the potentiometer 14, and the signal from the feedback potentiometer 35. The 90° clockwise movement of the servo motor 32, as called for, eventuates because of the generation of the appropriate combination of states by the counter 27, which results in the required combination of currents from the outputs of the transistor switches 29.

Stepping of the servo motor 32 in the desired clockwise direction results in actuating device 38 so as to produce a flow rate, and volume of fluid, from the pump in a direction which will counter the input command signal at the precise point when the objective to be achieved in the steering operation has been fulfilled. Accordingly, the steering device 50A is so connected, by means of the control rod 56 and through the coupling means 56A, to the potentiometer 58 that the flow of fluid to the steering device produces a movement of the piston rod which, in turn, effects a movement of the movable arm 58A on the potentiometer 58 such that a signal of opposite polarity to the initiating command signal is generated.

In the particular example just described, that is, an example according to which clockwise movement of the steering control member 12 has been brought about, the effect on the command signal potentiometer 14 is to produce movement of the wiper arm 14A toward the lower end of the potentiometer resistor R1. In countering this effect, the wiper arm 58A is moved toward the upper end of its potentiometer resistor R3, thus cancelling the effect of the command signal at the appropriate juncture. The arrangement is such that the required left-of-center movement of the piston 54, as shown in FIG. 2, in order to bring about upward movement of wiper arm 58A results from the aforesaid clockwise movement of the steering control member 12. Thus, the corresponding clockwise movement of the servo motor 32 actuates control device 38, thereby to effectuate fluid flow from the pump which, as indicated by the arrow adjacent the hydraulic line 44 is in such direction as to bring about the left-of-center movement of the piston rod 54.

Given the inertia present in the system, it will be understood that there is a time lag from the point at which the servo motor 32 has initially gone through the 90° clockwise movement until the piston rod 54 can begin to traverse the desired distance in achieving the steering position feedback control. As already indicated, as soon as the piston rod begins its travel, thereby to effect movement of the arm 58A, there begins the process of producing the feedback signal of opposite polarity to the input command signal. Consequently, there also begins the effect of nulling the input to the servo controller 20, thereby bringing the variable volume pump 40 back to a null position at the time that the piston rod 54 has stroked the appropriate distance so as to produce the desired steering maneuver.

Assuming that the input steering control member 12 is now returned to the neutral or straight ahead position, this results in generation of a negative going command signal. The eventual result is that a combination of currents is produced at the outputs of transistor switches 29 such that the servo motor 32 is moved in a counterclockwise direction the required amount. The consequence at the hydraulic end of the system is that the motor-pump 42 is caused to stroke in the opposite direction, thereby producing fluid flow as indicated by the arrow adjacent to hydraulic line 46.

As in the previous example described, that is, the case of fluid flow in the direction indicated by the arrow next to hydraulic line 44, the piston rod 54 begins to move in the opposite direction, that is, to the right within the cylinder 52 and that the instant this begins a counter or feedback signal of opposite polarity is generated, which acts to negative the initiating command signal so that the servo motor thereby begins to return to a null position and therefore the pump 40 returns to null at that instant when the piston rod 54 has moved sufficiently to the right to bring about a neutral or straight ahead position for the steering element, e.g., a rudder.

What is claimed is:

1. An electro-hydraulic steering system for remotely controlling the movement of a steering device comprising a steering control means for producing an input command signal, a servo motor, a servo controller responsive to the command signal from said steering control means for effecting movement of said motor, a pump coupled to said servo motor and controlled by said motor to produce varied rates of fluid flow, a steering device controlled by fluid flow from said pump so as to reach a predetermined position, and, means, coupled to respond to movement of said steering device, for feeding back a signal to said steering control means so as to null the input command signal to said servo controller and return said pump to a null position, when the predetermined position for said steering device has been reached.

2. A system as defined in claim 1 in which
said steering control means comprises a steering wheel and a first potentiometer.

3. A system as defined in claim 2 in which
said first potentiometer includes a movable contact connected to an input point on said servo controller.

4. A system as defined in claim 1 in which
said feedback means includes means for feeding a signal of a polarity opposite to said input command signal,
said feedback means having the same input point as said input signal.

5. A system as defined in claim 4,
said feedback means comprising a second potentiometer including a movable contact connected to said input point.

6. A system as defined in claim 1, further comprising an hydraulic circuit between said pump and said steering device,
and an over-center pump for effecting movement of said steering device in opposite directions from a null position.

7. A system as defined in claim 1, in which
said steering device comprises a cylinder and a piston within said cylinder for actuating a steering element.

8. A system as defined in claim 7 in which said piston is coupled to said feedback means.

9. A system as defined in claim 1, further including another feedback means connected between said servo motor and the input to said servo controller.

* * * * *